US012009149B2

(12) United States Patent
Kobayashi

(10) Patent No.: US 12,009,149 B2
(45) Date of Patent: Jun. 11, 2024

(54) PUSH-PULL SOLENOID

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 296 days.

(21) Appl. No.: 17/619,497

(22) PCT Filed: Aug. 28, 2019

(86) PCT No.: PCT/JP2019/033805
§ 371 (c)(1),
(2) Date: Dec. 15, 2021

(87) PCT Pub. No.: WO2021/038773
PCT Pub. Date: Mar. 4, 2021

(65) Prior Publication Data
US 2022/0375670 A1 Nov. 24, 2022

(51) Int. Cl.
*H01F 7/121* (2006.01)
*H01F 7/08* (2006.01)
*H01F 7/16* (2006.01)

(52) U.S. Cl.
CPC ............. *H01F 7/081* (2013.01); *H01F 7/121* (2013.01); *H01F 7/16* (2013.01); *H01F 2007/086* (2013.01)

(58) Field of Classification Search
CPC ........................... H01F 7/121; B22F 2301/355
(Continued)

(56) References Cited

U.S. PATENT DOCUMENTS 4,278,959 A * 7/1981 Nishimiya ............ H01F 7/1607 335/262
4,476,451 A * 10/1984 Kosugi ................. H01F 7/1607 335/262
(Continued)

FOREIGN PATENT DOCUMENTS

JP S63273306 A 11/1988
JP H0298607 U 8/1990
(Continued)

OTHER PUBLICATIONS

International Search Report (PCT/ISA/210) with translation and Written Opinion (PCT/ISA/237) mailed on Oct. 21, 2019, by the Japanese Patent Office as the International Searching Authority for International Application No. PCT/JP2019/033805.

*Primary Examiner* — Alexander Talpalatski
(74) *Attorney, Agent, or Firm* — BUCHANAN INGERSOLL & ROONEY PC

(57) ABSTRACT

A push-pull solenoid is provided with a cylindrical guide member that is fixed to a case. A circular outer peripheral surface of a plunger is in contact with a friction guide surface formed on a circular inner peripheral surface of the guide member, and slides along the friction guide surface. Frictional force due to contact with the friction guide surface is always acting on the plunger, so it is possible to suppress impact-like contact of the plunger with an object to be manipulated during suctioning, and vibration and noise caused thereby. Moreover, over-recovery and falling-out of the plunger after suction is released can also be prevented.

4 Claims, 4 Drawing Sheets

(58) Field of Classification Search
USPC .................................................. 335/255, 131
See application file for complete search history.

(56) References Cited

U.S. PATENT DOCUMENTS

| | | | | | |
|---|---|---|---|---|---|
| 5,110,087 | A * | 5/1992 | Studtmann | H01F 7/13 | 335/279 |
| 5,268,662 | A * | 12/1993 | Uetsuhara | H01F 7/13 | 335/229 |
| 5,886,607 | A * | 3/1999 | Ricker | H01F 7/1607 | 335/251 |
| 6,950,000 | B1 * | 9/2005 | Lanni | H01F 7/081 | 335/229 |
| 7,876,183 | B2 * | 1/2011 | Uruma | H01H 50/443 | 335/131 |
| 8,854,164 | B2 * | 10/2014 | Fleischer | H01F 7/1607 | 335/282 |

FOREIGN PATENT DOCUMENTS

| | | | |
|---|---|---|---|
| JP | 2006105264 | A | 4/2006 |
| WO | 2012032594 | A1 | 3/2012 |
| WO | 2013065179 | A1 | 5/2013 |

* cited by examiner

FRICTIONAL FORCE
STROKE (SLIDE POSITION)
a1 a4 a2 a3
C
7B
7A 47a
47

37a
37

27a
27

2
17
17a
7B
7A
41
42
43
4
6

PUSH-PULL SOLENOID

TECHNICAL FIELD

The present invention relates to a push-pull solenoid, and more specifically relates to a push-pull solenoid that is not provided with a recovery mechanism such as a recovery spring that applies force in a direction opposite from an attraction direction to a plunger and returns the plunger to an original position.

BACKGROUND ART

Push-pull solenoids are disclosed in, e.g., Patent Documents 1 and 2. In these push-pull solenoids, when a coil is energized, a plunger that is located at an initial position (return position) set apart from one end surface of a case is attracted by magnetic force toward a fixed iron core arranged inside the case and is withdrawn to a withdrawn position. A shaft that is coaxially linked to the plunger is pushed out from a case end surface on the opposite side. What is performed is, e.g., a manipulation in which an article to be manipulated is pushed out by the shaft. When the attraction is released by turning off the energization, the plunger, which has slid to the withdrawn position, returns to a free state in which the plunger is allowed to slide freely at that position because no recovery spring or other recovery mechanism is provided.

In cases where the article to be manipulated is, inter alia, a component having spring stiffness, an acceleration load will be applied, in a direction in which the shaft is pushed back, from the article to be manipulated to the shaft in the free state, and the shaft and the plunger will be pushed back toward the initial position (return position). In this instance, there are cases where the plunger is pushed back excessively to a position beyond the original initial position (return position) by inertia (over-recovery). In addition, in cases where the plunger is held in an orientation in which gravitational force is applied in the axial direction, because the weight of the shaft and the plunger is applied to the inertia produced by the load applied from the article to be manipulated, there is a concern that the shaft and the plunger will be dislodged from the case.

When the plunger is pushed back beyond the initial position (return position) and has been moved away from the fixed iron core by a set distance or greater, adverse events will occur, such as those in which, when the coil is again energized and the plunger is attracted, the attraction decreases or is not generated, the stroke of the plunger caused by the attraction increases, and the plunger makes shock-like contact with the article to be manipulated. As a result, it will be difficult to perform the manipulation in a consistently repetitive manner.

Push-pull solenoids provided with a recovery spring as a mechanism for recovering the plunger are also known in the prior art. For example, a compression coil spring is arranged as the recovery spring between a case end surface and the distal end of a plunger protruding from the case end surface. In this instance, if the two ends of the recovery spring are not respectively linked to the plunger and the case, it will be impossible to precisely position the plunger at a return position or an attraction position, and adverse events such as shock-like contact with an object and a reduction in attraction will occur. In addition, when the recovery spring is mounted, the axial length of the solenoid will increase by a corresponding amount, and the stroke of the plunger will become shorter by an amount corresponding to the close-contact length of the recovery spring.

PRIOR-ART DOCUMENTS

Patent Documents

Patent Document 1: JPU H02-98607 A
Patent Document 2: JP S63-273306 A

SUMMARY OF THE INVENTION

Problems to Be Solved By the Invention

In view of the foregoing, it is an object of the present invention to provide a push-pull solenoid provided with a simple mechanism with which it is possible to suppress shock-like contact with an article to be manipulated during attraction of a plunger, as well as vibration and noise caused by said contact, and with which it is possible to prevent the plunger from excessive recovery or dislodgment after the attraction is released.

Means of Solving the Problems

The push-pull solenoid of the present invention is characterized by being provided with

- a case,
- a base that is formed from a magnetic material, the base being fixed to the case,
- a plunger that is formed from a magnetic material, the plunger protruding from one axial-direction case end surface of the case in a state in which sliding in the axial direction is allowed,
- a coil that generates magnetic attraction for causing the plunger to slide in the axial direction from a return position set apart from the case end surface in a withdrawing direction approaching the case end surface, and
- a guide member that is attached to the case,
- the guide member being provided with a friction guide surface that guides the plunger in the axial direction in association with prescribed friction.

In the push-pull solenoid of the present invention, the plunger slides along the friction guide surface of the guide member when sliding in the axial direction. Prescribed friction acts on the plunger sliding along the friction guide surface in a direction opposite from the sliding direction. Once the attraction is released by turning off the energization, the plunger will not assume a free state in which sliding in the axial direction is allowed, and axial-direction sliding of the plunger will be restricted by the friction. Setting the friction to a suitable magnitude makes it possible to prevent over-recovery of the plunger caused by externally applied force, as well as to prevent the plunger from being dislodged the case, and also makes it possible to prevent or reduce shock-like contact with an article to be manipulated during attraction of the plunger, as well as vibration and noise caused by said contact.

A cylindrical member that coaxially surrounds the plunger protruding from the case end surface can be used as the guide member. In this instance, it is preferable to use the inner peripheral surface of the cylindrical member as the friction guide surface. An outer peripheral surface that slides in the axial direction along the inner peripheral surface of the cylindrical member is preferably formed on the plunger. Due to a simple configuration in which the cylindrical member is fixed to the end of the case, it is possible to ensure stable operation of the plunger in a push-pull solenoid that is not provided with a plunger recovery mechanism.

MODE FOR CARRYING OUT THE INVENTION

Figure 1B:
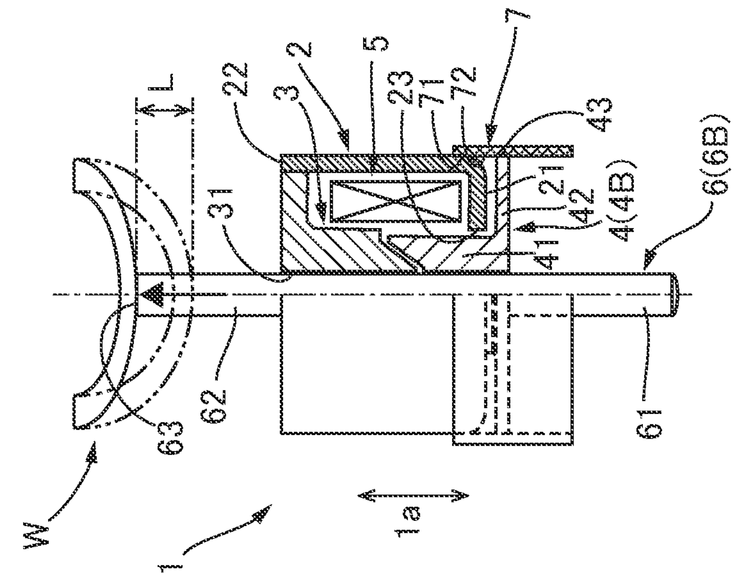
FIGS. 1(*a*) and 1(*b*) are explanatory diagrams showing the main configuration of a push-pull solenoid to which the present invention is applied.
Figure 1A:
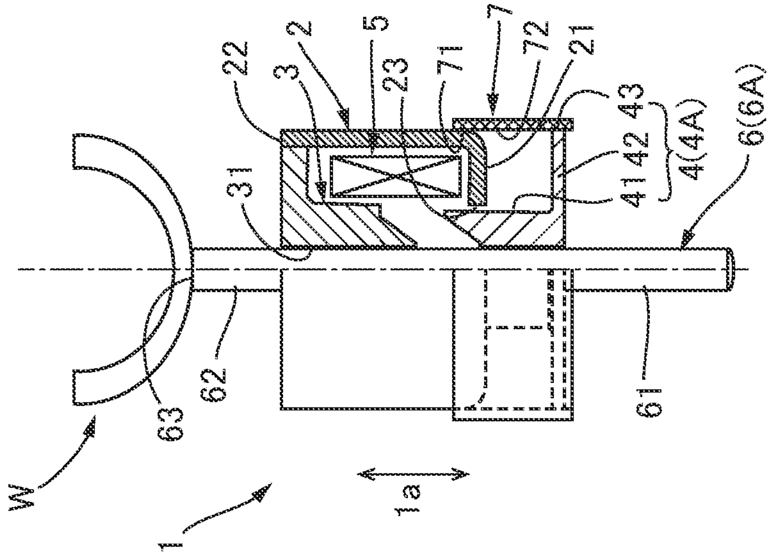

An embodiment of a push-pull solenoid to which the present invention is applied is described below with reference to the drawings. FIGS. 1(*a*) and 1(*b*) are explanatory diagrams showing the main configuration of the push-pull solenoid according to this embodiment; these drawings show the right half in cross-section. The push-pull solenoid 1 (also referred to as the "solenoid 1" below) is provided with a case 2 formed from a magnetic material, a base 3 that is a fixed iron core formed from a magnetic material, a plunger 4 that is a movable iron core formed from a magnetic material, and a coil 5. A shaft 6 formed from a non-magnetic material is securely linked to the plunger 4 in a coaxial manner.

Inside the case 2, the plunger 4 faces the base 3 in an axial direction 1*a*. The coil 5 is fixed to an inner peripheral surface of the case 2 and coaxially surrounds the facing portions of the base 3 and the plunger 4. When the coil 5 is energized, magnetic attraction is generated between the base 3 and the plunger 4 facing each other in the axial direction 1*a*. Due to the magnetic attraction, the plunger 4 is attracted from an initial position (return position) 4A shown in FIG. 1(*a*), at which the plunger 4 protrudes from one case end surface 21 of the case 2, to a withdrawn position 4B shown in FIG. 1(*b*), at which the plunger 4 is withdrawn toward the case end surface 21.

In the shaft 6, which slides integrally with the plunger 4, one shaft end section 61 protrudes in the axial direction 1*a* from the distal end surface of the plunger 4. The shaft 6 extends through a central shaft hole 31 in the base 3 in a slidable state. Another shaft end section 62 of the shaft 6 passes through the central shaft hole 31 in the base 3 and protrudes outward from another case end surface 22 of the case 2.

In a state in which the plunger 4 is located at the initial position (return position) 4A, the shaft 6 is located at a retreat position 6A, at which the shaft end section 62 is withdrawn toward the case end surface 22. When the plunger 4 is attracted to the withdrawn position 4B, the shaft 6 also slides in the same direction, sliding to a push-out position 6B, at which the shaft end section 62 is pushed out from the case end surface 22. For example, an article to be manipulated W, which is in contact with a shaft manipulation end 63 that is the distal end of the shaft end section 62, is pushed in the axial direction 1*a* by a prescribed distance due to the push-out operation of the shaft 6. The article to be manipulated W in the present example is provided with prescribed spring stiffness in the axial direction 1*a*.

The plunger 4 protruding from the case end surface 21 of the case 2 is provided with a small-diameter cylinder section 41 extending through a circular opening 23 in the case end surface 21 in a state in which sliding is allowed, and a large-diameter disc-form plunger head section 42 that protrudes outside of the case and that is formed at the distal end of the cylinder section 41. The outer peripheral surface of the plunger head section 42 is configured as a circular outer peripheral surface 43 of uniform width.

A guide member 7 that guides the sliding of the plunger 4 is attached to the case-end-surface 21 side of the case 2. The guide member 7 in the present example is a cylinder member formed from a non-magnetic material. The guide member 7 coaxially surrounds the portion of the plunger 4 that protrudes from the case end surface 21. One end of the circular inner peripheral surface of the guide member 7 is configured as a case-side fixed section 71 that is coaxially fixed by bonding to the outer peripheral surface of the case 2. The remaining inner peripheral surface portion of the circular inner peripheral surface is configured as a friction guide surface 72 that guides the circular outer peripheral surface 43 of the plunger 4 in the axial direction 1*a* in association with prescribed friction. The guide member 7 is preferably formed from a gel material, an elastomer material, or a plastic material so that it is possible to generate small friction suited to the application.

Figure 2A:
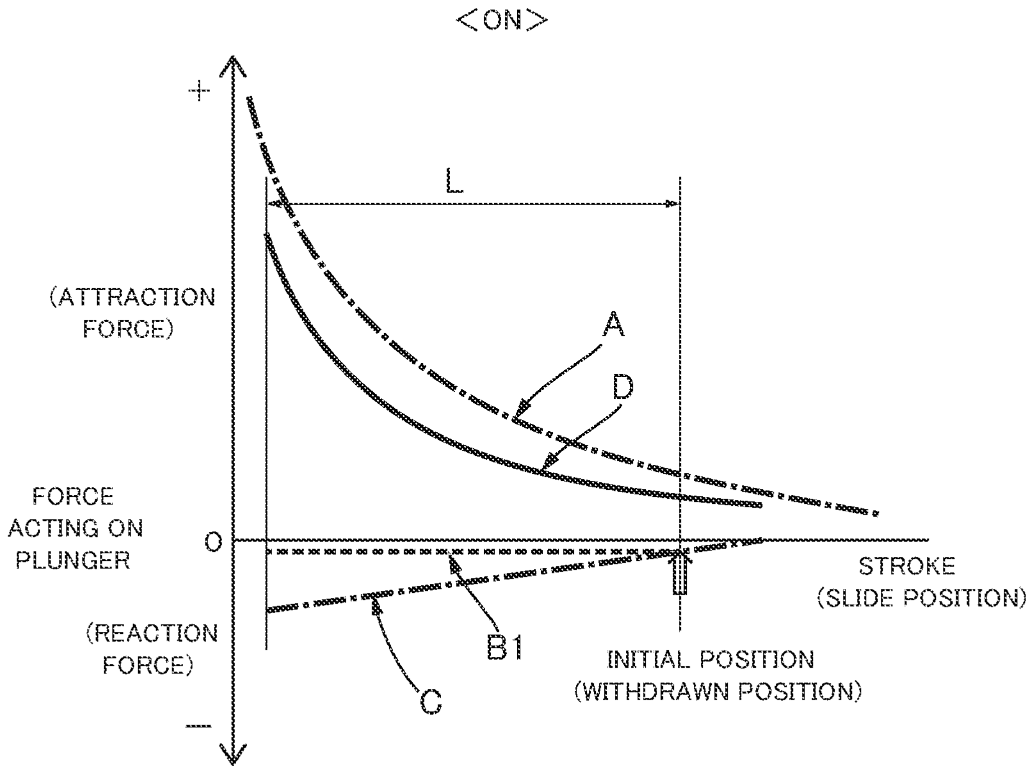
FIGS. 2(*a*) and 2(*b*) are graphs showing the relationship between a slide position of a plunger and force acting on the plunger.
Figure 2B:
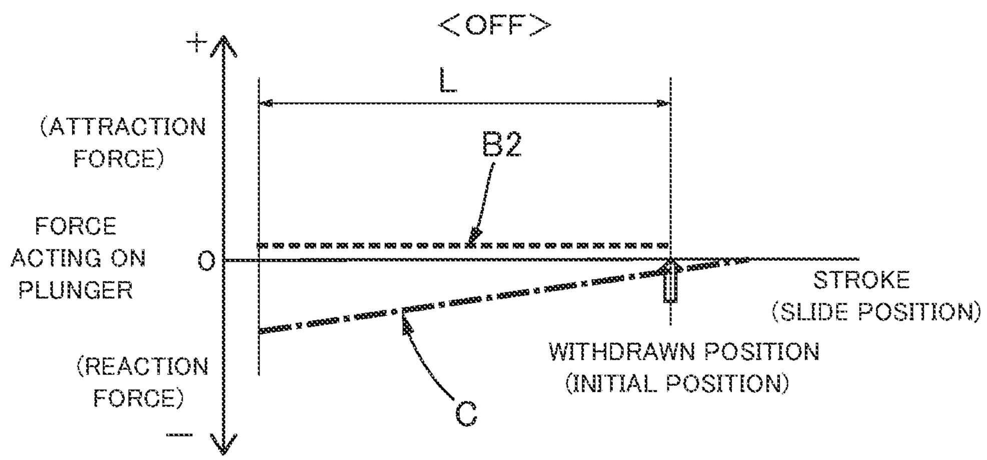

An operating example of a case in which the article to be manipulated W is pushed out by the solenoid 1 is described below with reference to FIGS. 1 and 2. FIGS. 2(*a*) and 2(*b*) are graphs showing the relationship between a slide position (stroke) of the plunger 4 and force acting on the plunger 4 when the solenoid 1 is on and when the solenoid 1 is off.

In the solenoid 1, as shown in FIG. 1(*a*), the plunger 4 is located at the initial position (return position) 4A at which the plunger 4 protrudes from the case end surface 21. The shaft manipulation end 63 of the shaft 6 comes into contact with the article to be manipulated W, which is provided with spring stiffness, from the axial direction 1*a*.

When the solenoid 1 is turned on and the coil 5 is energized, the plunger 4 is attracted by magnetic force toward the base 3, the plunger 4 being attracted from the initial position (return position) 4A to the withdrawn position 4B. The shaft 6 in contact with the article to be manipulated W is thereby pushed out from the retreat position 6A to the push-out position 6B, pushing out the article to be manipulated W. The circular outer peripheral surface 43 of the plunger head section 42 slides in the axial direction 1*a* in association with uniform frictional resistive force along the friction guide surface 72 formed on the circular inner peripheral surface of the guide member 7 attached to the case 2.

In FIG. 2(*a*), curve A indicates the magnitude of magnetic force produced between the base 3 and the plunger 4. The magnetic force increases as the plunger 4 approaches the base 3. In contrast, straight line B1 indicates friction produced between the plunger 4 and the guide member 7. In the present example, the friction has a uniform magnitude irrespective of the slide position of the plunger 4 and acts in a return direction opposite from the plunger attraction direction. When the shaft 6 pushes out the article to be manipulated W, external force applied to the shaft 6 from the article to be manipulated W, which is provided with spring stiffness, increases in accordance with the push-out amount as indicated by straight line C. In this instance, the attraction-direction manipulation force of the plunger 4 is represented by curve D.

After the plunger 4 is attracted to the withdrawn position 4B and the article to be manipulated W is pushed out to the push-out position by the shaft 6, the solenoid 1 is turned off and the energization of the coil 5 is stopped. As a result, the plunger 4 is released, and due to the external force from the article to be manipulated W that is acting on the shaft 6, the plunger 4 is pushed back from the withdrawn position 4B toward the initial position (return position) 4A. As shown in FIG. 2(*b*), in this instance as well, the friction produced between the plunger 4 and the guide member 7 has a uniform value and acts in the plunger attraction direction, as indicated by straight line B2. The external force decreases as the plunger 4 approaches the return position, as indicated by straight line C. At the initial position (return position), if the friction is set so that the value of the friction and the value of the external force acting in the opposite direction are equal, the plunger 4 can be stopped at the initial position (return position). This makes it possible to prevent over-recovery, in which the plunger 4 is pushed back to a position beyond the initial position (return position) by the external force. It is also possible to prevent dislodgment, in which the plunger 4 slips out from the case 2. Furthermore, because the plunger 4 can be precisely recovered to the initial position (return position), it is possible, during the subsequent energization, to attract the plunger 4 toward the withdrawn position using suitable attraction.

The guide member 7 in the present example is a cylinder member of uniform thickness, and the inside-diameter dimensions of the circular inner peripheral surface thereof are uniform at each position in the axial direction 1*a*. The friction produced at each slide position of the plunger 4 is thereby uniform. The inside diameter, thickness, and degree of interference of the guide member 7, which is formed in a cylinder shape, are preferably designed so that the required friction is obtained. In particular, the friction changes greatly according to the axial-direction cross-section of the guide member 7 having the cylinder shape.

Figures 3, 3B:
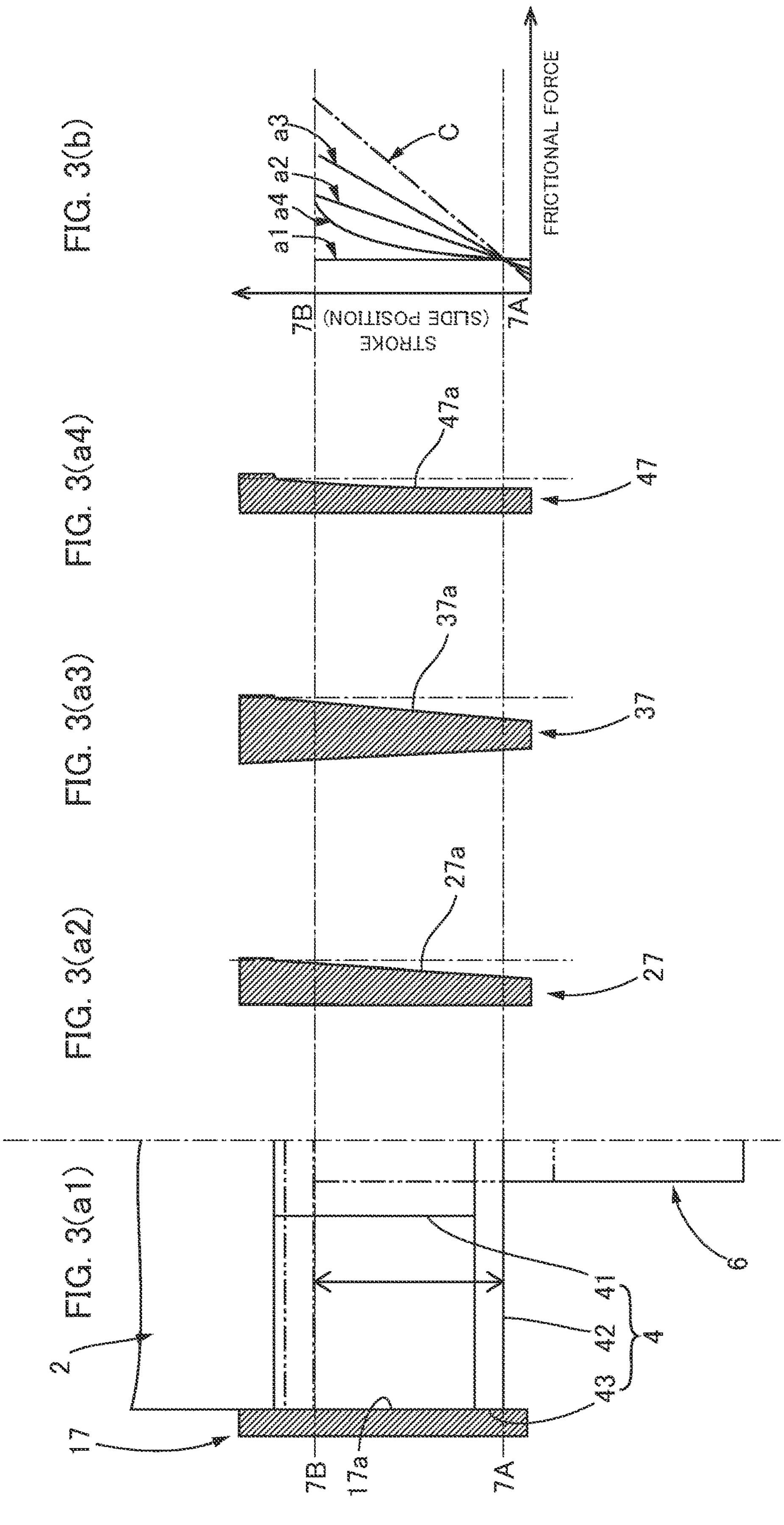
FIGS. 3(*a*1) to 3(*a*4) are explanatory diagrams showing guide members for which the axial-direction cross-sectional shape is configured in four different types of cylinder shapes, and FIG. 3(*b*) is a graph showing the relationship between friction and the slide position of the plunger in cases where guide members having each of the shapes are used.

FIGS. 3(*a*1) to 3(*a*4) show examples of guide members for which the axial-direction cross-sectional shape is configured in four different types of cylinder shapes. FIG. 3(*b*) is a graph showing the relationship between friction and the slide position of the plunger 4 in cases where guide members having each of the shapes are used. Straight line C in FIG. 3(*b*) shows reaction force from outside, similarly to the case shown in FIG. 2.

A guide member 17 having the cylinder shape shown in FIG. 3(*a*1) is the same as the guide member 7 shown in FIG. 1. The guide member 17 has a cross-sectional shape in which the thickness is the same in the axial direction, and the inside diameter of a friction guide surface 17*a* is also the same. In this instance, as indicated by a line a1 in FIG. 3(*b*), the friction acting on the plunger 4 is substantially uniform. A guide member 27 having the cylinder shape shown in FIG. 3(*a*2) has a trapezoidal cross-sectional shape such that the outside diameter remains the same and the inside diameter gradually decreases along the axial direction from a position 7A contacted by the plunger 4 in the initial position (return position) to a position 7B contacted by the plunger 4 in the withdrawn position. Friction produced by a friction guide surface 27*a* increases linearly along the axial direction from the position 7A to the position 7B, as indicated by a line a2 in FIG. 3(*b*). A guide member 37 having the cylinder shape shown in FIG. 3(*a*3) has a cross-sectional shape such that the outside diameter and the inside diameter both gradually decrease along the axial direction from the position 7A to the position 7B. Friction produced by a friction guide surface 37*a* increases linearly with a high slope along the axial direction from the position 7A to the position 7B, as indicated by a line a3 in FIG. 3(*b*). A guide member 47 having the cylinder shape shown in FIG. 3(*a*4) has a cross-sectional shape such that the outside diameter is uniform and the inside diameter gradually decreases in a curving manner along the axial direction from the position 7A to the position 7B. Friction of a curved-surface friction guide surface 47*a* in this instance increases in a curving manner along the axial direction from the position 7A to the position 7B, as indicated by a line a4 in FIG. 3(*b*). Thus, changing the cross-sectional shape of the cylinder member makes it possible to obtain required friction.

Figures 4A, 4B, 4C, 4D, 4E:
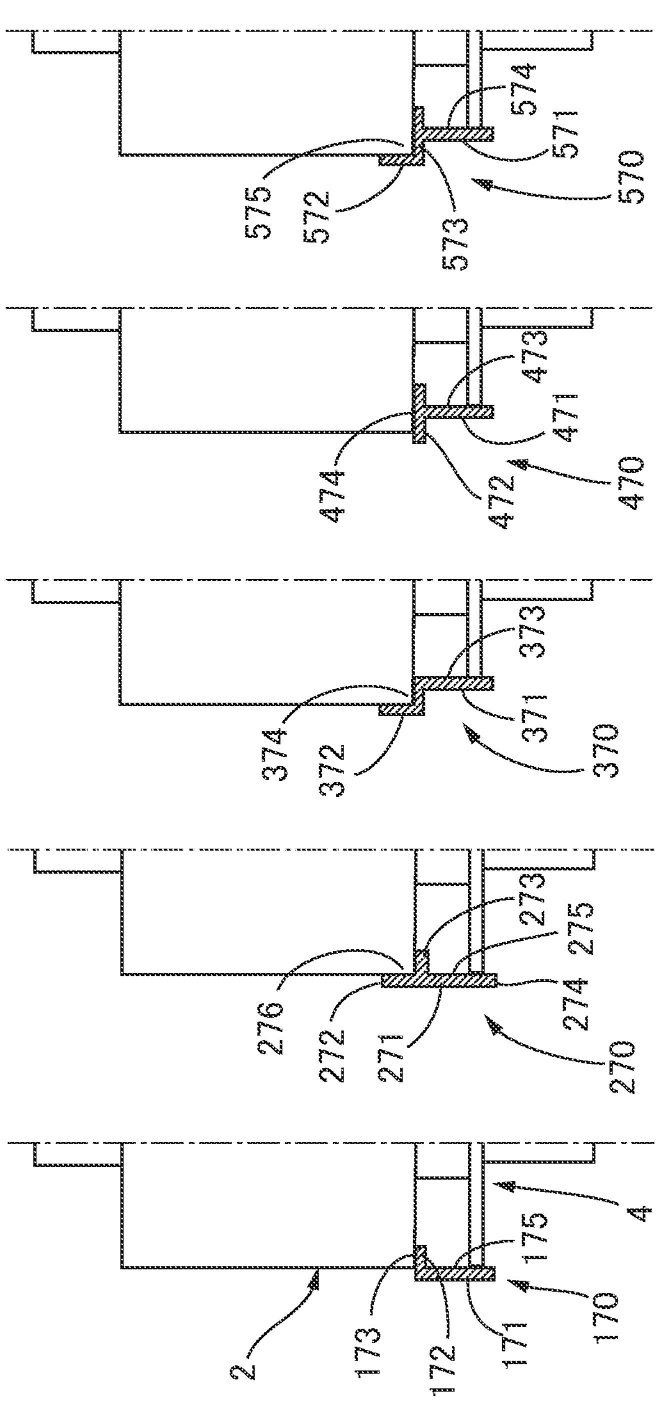
FIGS. 4(*a*) to 4(*e*) are explanatory diagrams showing examples of guide members having cylinder shapes.

FIG. 4 is a set of explanatory diagrams showing further examples of guide members having cylinder shapes. A guide member 170 shown in FIG. 4(*a*) is provided with a cylinder portion 171 provided with a friction guide surface 175 formed from a circular inner peripheral surface, and an annular flange 172 formed so as to be bent radially inward at a right angle from one open end of the cylinder portion 171. An annular end surface 173 of the annular flange 172 is a case-side fixed section that is fixed by bonding to the case end surface of the case 2.

In a guide member 270 shown in FIG. 4(*b*), an annular flange 273 that protrudes radially inward is formed integrally with a cylinder body 271 at a position near one axial-direction open end 272 in the circular inner peripheral surface of the cylinder body 271. A circular inner peripheral surface extending from another open end 274 of the cylinder body 271 to the annular flange 273 is a friction guide surface 275. The annular flange 273 is positioned between the plunger 4 and the case 2 in the axial direction and functions as an air gap spacer for reducing effects of residual magnetism when the plunger 4 is recovered to the initial position (return position). The annular end surface of the annular flange 273 facing toward the case 2 and the circular inner peripheral surface of the cylinder body are case-side fixed sections 276 that are fixed by bonding to the case.

A guide member 370 shown in FIG. 4(*c*) is configured such that a large-diameter cylinder body 372 is formed coaxially and integrally with a small-diameter cylinder body 371. The circular inner peripheral surface of the small-diameter cylinder body 371 is a friction guide surface 373. The circular inner peripheral surface of the large-diameter cylinder body 372 and the annular end surface of the cylinder body are case-side fixed sections 374 that are fixed by bonding to the case.

A guide member 470 shown in FIG. 4(*d*) is configured such that an annular flange 472 is formed coaxially and integrally with the end of a cylinder body 471. The circular inner peripheral surface of the cylinder body 471 is a friction guide surface 473. The annular flange 472 extends radially inward and outward from the cylinder body 471. The annular end surface of the annular flange 472 is a case-side fixed section 474 that is fixed by bonding to the case end surface of the case.

A guide member 570 shown in FIG. 4(*e*) is provided with a small-diameter cylinder body 571, a large-diameter cylinder body 572 that is formed coaxially and integrally with the end of the small-diameter cylinder body 571, and an annular flange 573 formed between the two cylinder bodies. The circular inner peripheral surface of the small-diameter cylinder body 571 is a friction guide surface 574. The annular flange 573 protrudes further radially inward than the circular inner peripheral surface of the small-diameter cylinder body 571 and functions as an air gap spacer. The circular inner peripheral surface of the large-diameter cylinder body 572 and the annular end surface of the annular flange 573 are case-side fixed sections 575 that are fixed by bonding to the case 2.

The invention claimed is:

1. A push-pull solenoid comprising:

a case;

a base that is formed from a magnetic material, the base being fixed to the case;

a plunger that is formed from a magnetic material, the plunger protruding from a case end surface on one side of an axial direction of the case in a state in which sliding in the axial direction is allowed;

a coil that generates magnetic attraction for causing the plunger to slide along the axial direction from a return position set apart from the case end surface toward a withdrawing direction approaching the case end surface; and a guide member that is attached to the case, the guide member being provided with a friction guide surface that guides the plunger in the axial direction in association with prescribed friction;

wherein the guide member is a cylindrical member that coaxially surrounds the plunger protruding from the case end surface, the cylindrical member has an inner peripheral surface formed with the friction guide surface, and the plunger has an outer peripheral surface that slides in the axial direction along the inner peripheral surface of the cylindrical member; and wherein the guide member is provided with an annular flange having a prescribed thickness, the annular flange protruding radially inward from the inner peripheral surface of the cylindrical member and being formed along an outer peripheral edge part of the case end surface.

2. The push-pull solenoid according to claim 1, wherein the guide member is formed from a gel material, an elastomer material, or a plastic material.

3. The push-pull solenoid according to claim 1, wherein the friction produced by the friction guide surface is set uniform at each slide position in the axial direction of the plunger.

4. The push-pull solenoid according to claim 1, wherein the friction produced by the friction guide surface is set so as to increase as the plunger slides along the axial direction from the return position toward the withdrawn direction.

* * * * *